(12) United States Patent
Austin

(10) Patent No.: US 7,373,085 B2
(45) Date of Patent: May 13, 2008

(54) HYBRID SATELLITE AND FIBER COMMUNICATIONS SYSTEM

(75) Inventor: John T. Austin, Rancho Palos Verdes, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 1130 days.

(21) Appl. No.: 09/732,837

(22) Filed: Dec. 7, 2000

(65) Prior Publication Data

US 2002/0004391 A1 Jan. 10, 2002

Related U.S. Application Data

(60) Provisional application No. 60/173,343, filed on Dec. 28, 1999.

(51) Int. Cl.
H04B 10/00 (2006.01)

(52) U.S. Cl. ............... 398/121; 398/115; 398/118; 398/124; 398/125; 398/126; 398/128; 398/135; 455/427; 455/428; 455/12.1; 455/13.1; 455/430; 370/316; 370/315; 370/310; 370/319; 370/401; 370/324; 370/390; 370/394; 370/474; 375/200; 375/207

(58) Field of Classification Search ............... 398/118, 398/121, 124, 125, 126, 128, 115, 135; 455/427, 455/428, 430, 12.1, 13.1; 370/316, 319, 370/315, 474, 394, 310, 401, 390, 324; 375/200, 375/207
See application file for complete search history.

(56) References Cited

U.S. PATENT DOCUMENTS

| | | | |
|---|---|---|---|
| 5,852,721 A * | 12/1998 | Dillon et al. ............... 709/217 |
| 5,896,558 A * | 4/1999 | Wiedeman ................. 455/12.1 |
| 5,963,862 A | 10/1999 | Adiwoso et al. |
| 6,020,845 A * | 2/2000 | Weinberg et al. ........... 342/354 |
| 6,023,242 A * | 2/2000 | Dixon ........................ 342/359 |
| 6,049,593 A * | 4/2000 | Acampora .................. 379/56.2 |
| 6,067,453 A * | 5/2000 | Adiwoso et al. ............ 455/430 |
| 6,160,994 A * | 12/2000 | Wiedeman ................. 455/12.1 |
| 6,233,456 B1 * | 5/2001 | Schiff et al. ................ 455/439 |
| 6,252,544 B1 * | 6/2001 | Hoffberg ................. 342/357.1 |
| 6,272,317 B1 * | 8/2001 | Houston et al. ........... 455/13.1 |
| 6,324,586 B1 * | 11/2001 | Johnson ..................... 709/248 |
| 6,460,085 B1 * | 10/2002 | Toporek et al. ............. 709/233 |
| 6,490,066 B1 * | 12/2002 | Korevaar .................... 398/128 |
| 6,560,213 B1 * | 5/2003 | Izadpanah et al. .......... 370/338 |
| 6,684,030 B1 * | 1/2004 | Taylor et al. ................. 398/59 |
| 6,792,615 B1 * | 9/2004 | Rowe et al. .................. 725/37 |
| 6,912,075 B1 * | 6/2005 | Ionov et al. ................ 398/126 |
| 6,985,454 B1 * | 1/2006 | Wiedeman et al. ......... 370/316 |

OTHER PUBLICATIONS

Hower, S.M.; MPEG-2 video satellite transmisssion using ATM technology, Broadcasting Convention, International (Conf. Publ. No. 428), Sep. 12-16, 1996, pp. 466-470.*
Izadpanah, H.; A millimeter wave broadband wireless access technology demonstrator generation Internet network reach extension, Communications Magazine, IEEE, vol. 39, Issue 9, Sep. 2001 pp. 140-145.*
Patterson, D.; Teledesic: A Global Broadband Network, 1998 IEEE.*

* cited by examiner

Primary Examiner—Hanh Phan

(57) ABSTRACT

A communication system employing optical fibers and a high data rate satellite is utilized to provide high-speed Internet access to various geographic regions. In one aspect, a first teleport station is located geographically separated from a first user. The first teleport station is connected through a network access point to the Internet. The second user communicates through a satellite to the first teleport station to access the Internet. The teleport station and the network access point use a long haul optical fiber.

19 Claims, 6 Drawing Sheets

HYBRID SATELLITE AND FIBER COMMUNICATIONS SYSTEM

CROSS-REFERENCE TO RELATED APPLICATIONS

This application claims benefit of U.S. Provisional Application No. 60/173,343, filed Dec. 28, 1999 for "HYBRID SATELLITE AND FIBER COMMUNICATION SYSTEM", inventor: John T. Austin, which application is hereby incorporated by reference herein.

TECHNICAL FIELD

The present invention relates generally to a communications system and, more particularly, to a communications system combining optical fiber architecture and satellite-based communication.

BACKGROUND ART

In this communication age, content providers are increasingly investigating ways in which to provide more content to users as well as interfacing with new users that are unserved or underserved.

Communications satellites have become commonplace for use in many types of communication services, e.g., data transfer, voice communications, television program distribution, and other data transfer applications. In particular, data transfer may include coupling to the Internet to take advantage of various resources provided therethrough.

Optical communications systems such as broadband-type systems have also become increasingly popular to provide high speed Internet access to subscribers. Telephone companies and cable television companies are rapidly expanding the broadband infrastructure. As the Internet continues to grow, a demand for increased bandwidth also continues to grow. Applications such as video conferencing, on-demand video, and streaming audio/video applications consume much bandwidth.

Higher demand for capacity in the Asia-Pacific region and other emerging areas such as Eastern Europe and South America is increasing.

The United States has a well developed Internet backbone that provides broadband connectivity to a large part of the country. Developing countries as well as in locations also having not established high speed Internet backbones. It would therefore be desirable to provide a communications system that allows access to the Internet via the U.S. Internet backbone without the need to wait for buildout of terrestrial infrastructure to reach underserved or unserved customers.

SUMMARY OF THE INVENTION

It is therefore one object of the invention to provide a communications system that uses both optical and satellite links to provide Internet access particularly to underserved or unserved areas of the world.

In one aspect of the invention, a first teleport station is located geographically separated from a second user. The first teleport station is connected through a network access point to the Internet. The second user communicates through a satellite to the first teleport station to access the Internet. The teleport station are connected via the network access point use a long haul optical fiber.

In a further aspect of the invention, a method of operating a communications system comprises the steps of:

directing a communication to a satellite from a first geographic location;

directing the communication from the satellite to a teleport station in a second geographic location;

coupling the communication through a teleport station to a network access point through a long haul optical fiber; and, directing the communication to the Internet through the network access point.

One advantage of the invention is that the system may be modified so that as portions of the world develop, the system may be continually changed as the local infrastructures are developed.

Other objects and features of the present invention will become apparent when viewed in light of the detailed description of the preferred embodiment when taken in conjunction with the attached drawings and appended claims.

DETAILED DESCRIPTION OF THE INVENTION

Figure 1:
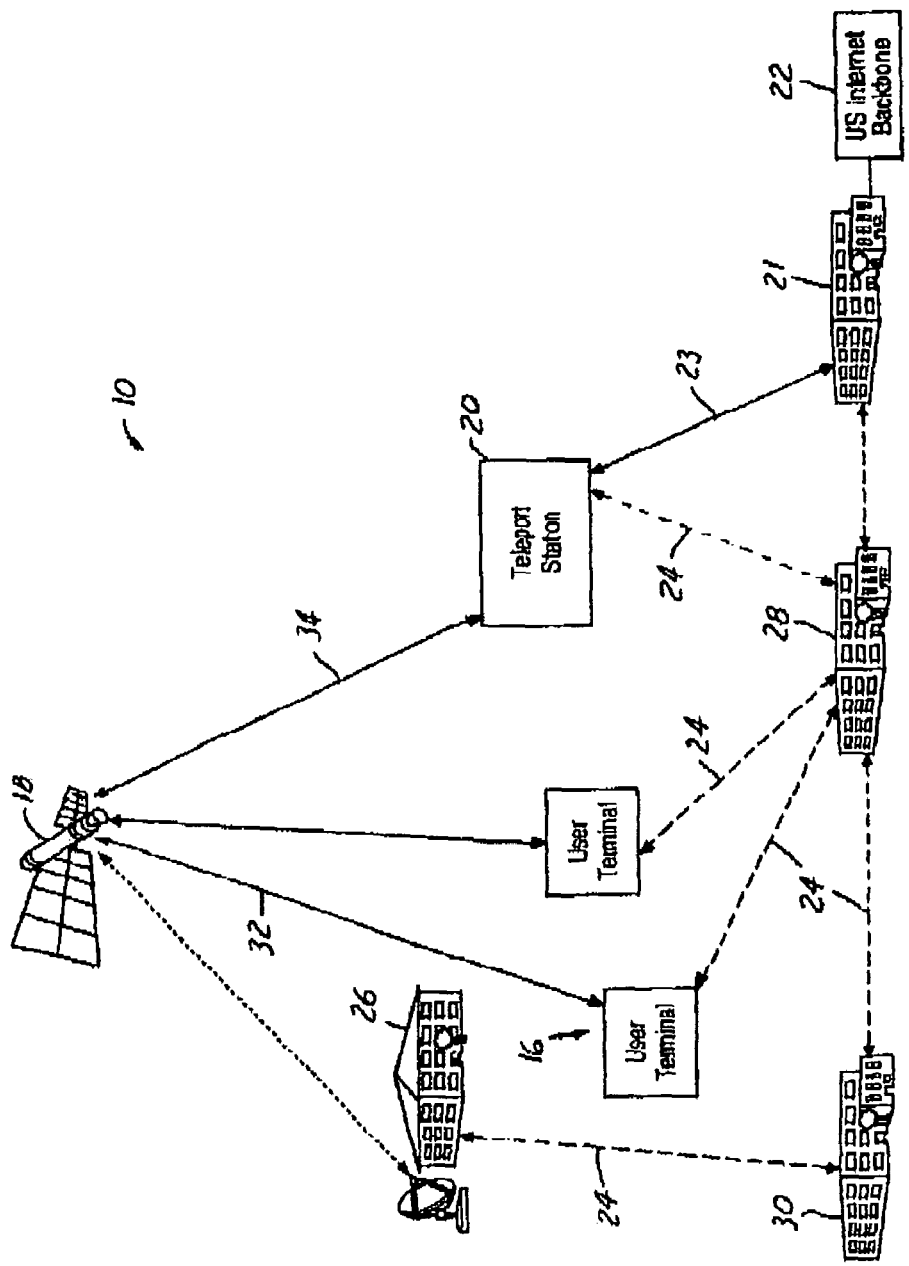
FIG. 1 is a high level system view of a first embodiment of the present invention.

In the following description, the same reference numerals are used to identify the same components in the various views. Those skilled in the art will recognize that various other embodiments, structural changes and changes in measures may be made without departing from the scope of the invention.

Referring now to FIG. 1, a communications system 10 is generally used to couple a plurality of user terminals 16 with a satellite 18. A plurality of user terminals 16 are used to illustrate various types of users which may include various consumer and business type applications. Each user terminal 16 may receive a signal with a predetermined signal strength from a spot beam pattern radiated from satellite 18.

Communications system 10 further includes a teleport station 20 that is coupled to the Internet backbone 22 through a long haul optical fiber 23. Because the United States has superior Internet infrastructure in place, it is envisioned that likely applications will couple teleport station 20 to the United States Internet backbone. The United States Internet backbone is recognized as being the most highly developed in the world. The coupling of teleport station 20 may be done through a network access point 21. If the teleport station 20 and network access point 21 are not physically combined, they may be connected together through the use of long-haul optical fiber connection 23.

Communications system 10 may also include a satellite control facility 26 that is used to control the operation of satellite 18. For example, telemetry, tracking and control functions may be communicated to satellite 18 using a frequency band such as Ka-band different from that between user terminals 16 and that of communications between satellite 18 and teleport station 20.

Communications system 10 may also include a network operation center (NOC) 28 that is coupled to customers 16, teleport station 20, and network access point 21. Network operations center 20 is used to control the operations of the network including billing and other administrative functions. Network operations center 28 may be coupled to customer user terminal 16, teleport station 20, network access point 21 and operation control center 30 through a low rate data connection 24. The low speed data connection 24 may be used for administration purposes or act as a back-up for the satellite for administration functions normally processed through satellite 18. Communications system 10 may also include an operation control center 30 used for coupling network operations center 28 to the satellite control facility 26. Although satellite control facility 26, operation control center 30, network operations center 28, and network access point 21 are illustrated as separate components, those skilled in the art would recognize that the functions of the components may be combined into a single facility.

The communications signals between satellite 18 and user terminal 16 may be referred to as user link 32. User links 32 represent the transmit and receive beams from both categories of user terminal 16 and satellite 18. A feeder link 34, is defined between satellite 18 and teleport station 20. Communications of links is preferably performed in a frequency such as Ka band or V band.

Satellite 18 is preferably a geosynchronous multi-beam satellite. This allows for easy connectivity of the satellite 18 between various regions separated by a geographically long distance. Each of the user terminals 16, teleport station, network operations center 28, operation control center 30 and satellite control facility 26 have a satellite antenna that, when a geosynchronous satellite is used, need only be directed once to satellite 18.

Figure 2:
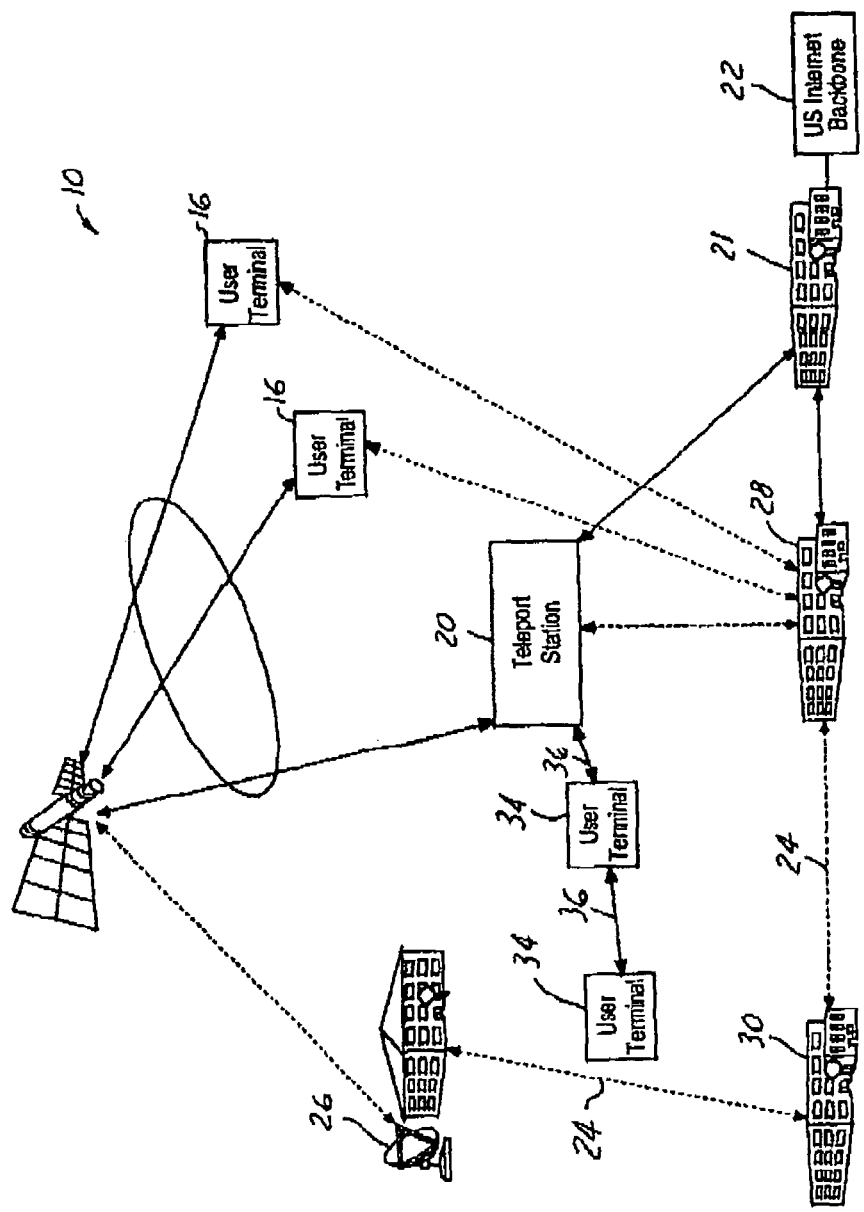
FIG. 2 is a system level view of a communications system according to a second embodiment of the present invention.

Referring now to FIG. 2, a satellite system 10' similar to that shown in FIG. 1 is illustrated. For convenience, the same reference numerals are used to represent the same components in the various views. In this embodiment, system users 34 are coupled to teleport station 20 with optical fibers 36. In this manner, such a system may be contemplated for newly developing countries in which optical fibers are laid. Customers 34 will be coupled directly to a teleport station 20 which in turn could direct them directly to the U.S. Internet backbone 22 through satellite 18.

Figure 3:
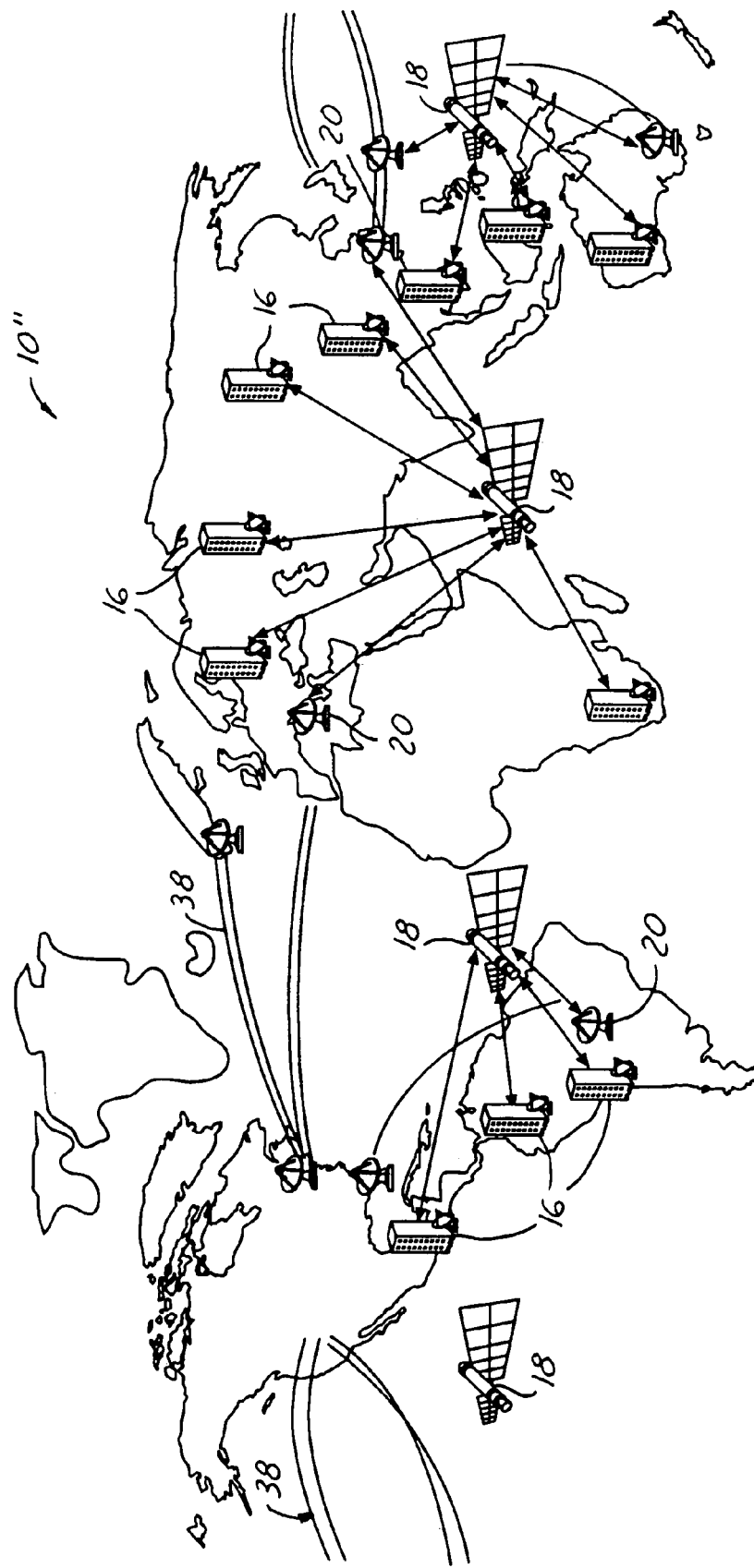
FIG. 3 is a system level view of a third embodiment of the present invention.

Referring now to FIG. 3, a modified system 10" according to the present invention is illustrated. In this embodiment the same reference numerals are used to refer to the same elements as those in FIGS. 1 and 2. In this embodiment, long haul optical fibers 38 are used to expand over vast expanses such as the ocean. In such a manner, satellites 18 do not require intersatellite links which, as described above, are generally undesirable due to weight and practical limitations. Long haul optical fibers 38 are used to connect the continents while satellites 18 connect teleport stations 20 and user terminals 16. It should be noted that in such an embodiment teleport stations 20 may be relocated as rapid expansion of the network beyond the existing fiber infrastructure takes place.

Figure 4:
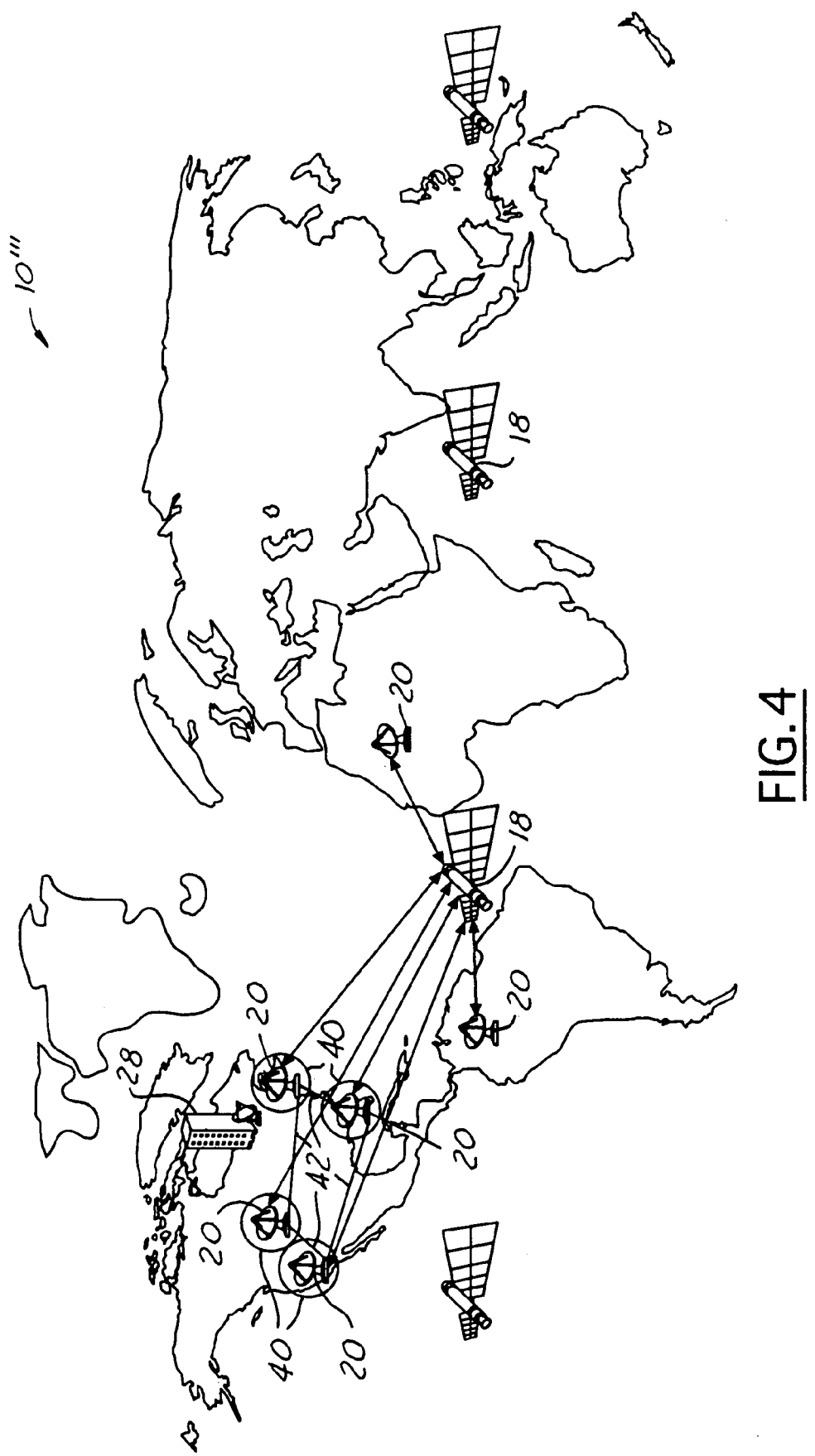
FIG. 4 is a system level view of a fourth embodiment of the present invention.

Referring now to FIG. 4, another embodiment of a communications system 10 is illustrated. In this embodiment, a plurality of beams 40 are illustrated generated from satellite 18. Beams 40 are spot beams which are geographically non-coextensive. By providing multiple teleport stations 20 in geographically distinct areas, any weather-affected teleport stations may not be used while still allowing communication at another teleport station. Also, by providing geographically distinct teleport stations 20, the frequencies of spot beams 20 may be reused. Preferably, teleport stations 20 are located in different parts of the country. However, other arrangements may be used such as separating the stations by at least a beamwidth so that different beams may be used for the different teleport stations. In other configurations, the same teleport station may be located in the same beam to provide a backup within the same beam.

Figure 5:
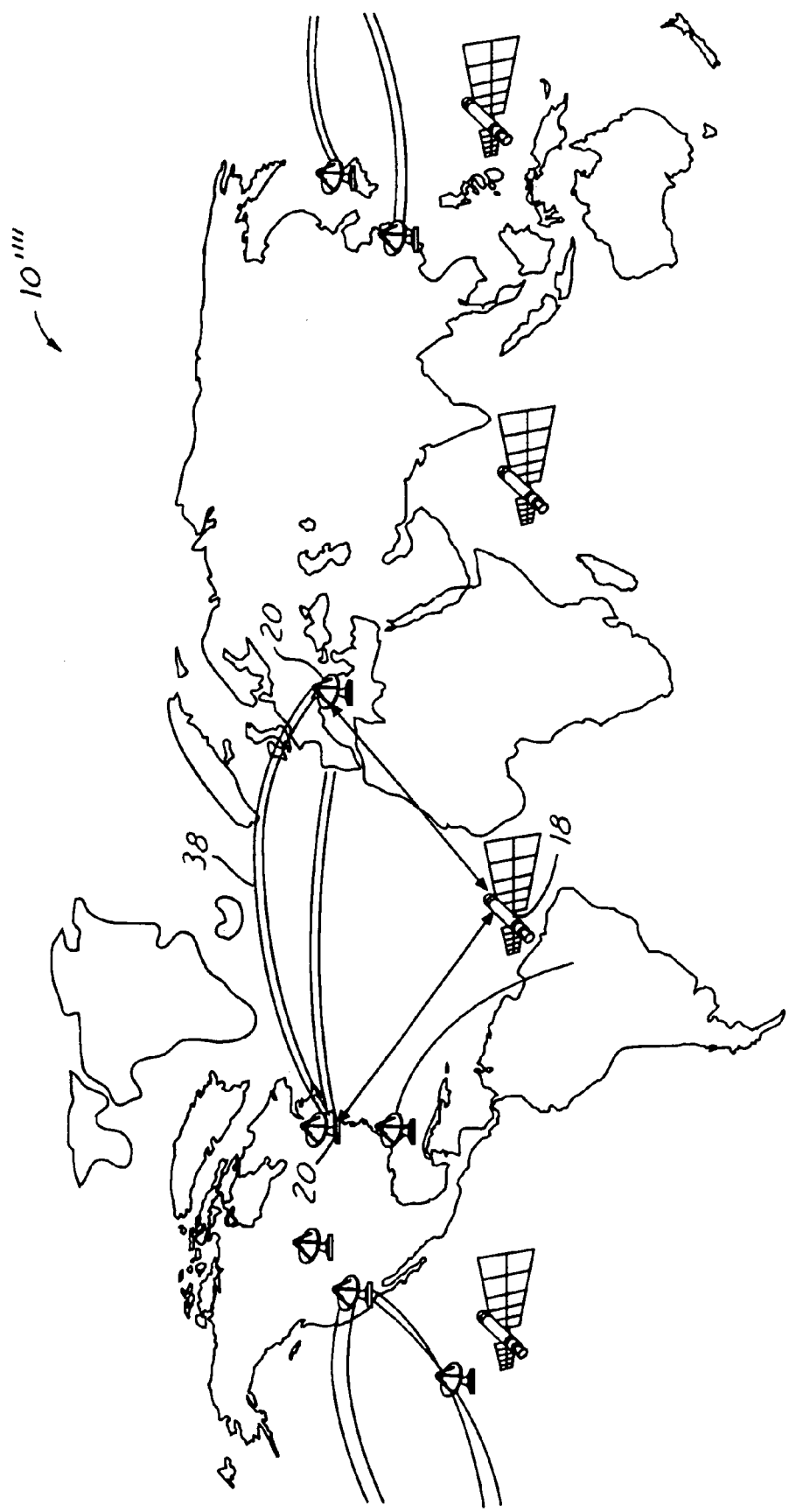
FIG. 5 is a is a system level view of a fifth embodiment of the present invention.

Referring now to FIG. 5, a fifth embodiment of communications system 10 is illustrated. In this embodiment, satellite 18, which is in communication with a first teleport station 20 on the North American continent, and a second teleport station 20 on the European continent is provided. When a failure or irregularity of the long haul optical fiber 38 is discovered, teleport stations 20 route communications between teleport stations by way of satellite 18. Long haul optical fiber 38 is illustrated crossing the Atlantic Ocean, however, a long haul optical fiber 30 is also illustrated crossing the Pacific Ocean. Other long haul fibers may cross large geographic land areas as well.

One advantage of this configuration is that upon an irregularity such as overload, the satellite payload may compensate for surge traffic on the optical fiber, or vice-versa.

Figure 6:
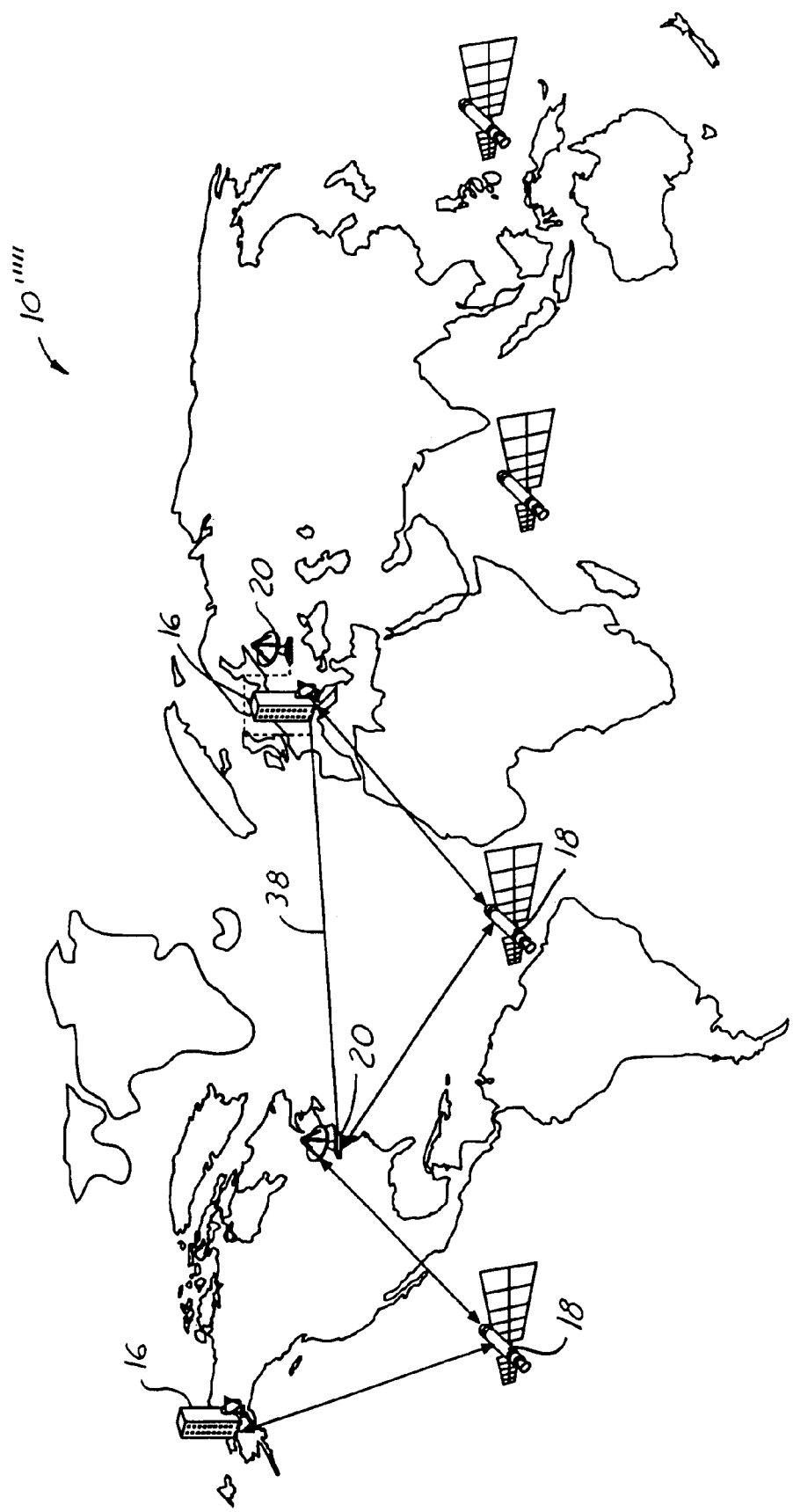
FIG. 6 is a system level view of a sixth embodiment of the present invention.

Referring now to FIG. 6, a "double hop" connection is illustrated. In this embodiment of communications system 10, a customer user terminal 16 such as that located in Alaska directs a communication to a first satellite 18. Satellite 18 directs the communication to a first teleport station 20 and then to either a long haul optical fiber 38 or another satellite 18. The satellite 18 or long haul optical fiber 38 delivers the communication to customer 20. The satellite 18 may also route the communication to a teleport station for distribution to a customer user terminal 16.

In operation, as is described above, various embodiments of the present invention are illustrated. Each of the embodiments of the present invention utilizes a form of optical link through a fiber optic cable together with the use of a satellite 18. Worldwide Internet service providers, competitive local exchange providers, and other broadband service providers with access to the US Internet backbone network on an on-demand pay-by-usage basis may be formed without the delays in access inherent in waiting for build out of terrestrial infrastructure to reach customers and areas currently underserved or unserved by broadband services. Worldwide corporate customers, government users, remote users and other end users of broadband services with access to the US Internet backbone are provided. International expansion is contemplated by using long haul, ultra-high data rate satellite links to connect developing regions of the globe into the US Internet backbone and other data/multi-media network structure without the delays of building out the system as described above.

Advantageously, the satellites 18 do not have optical laser crosslinks which reduce the overall system cost and risk of malfunction.

Another advantage of the invention is that multiple ground stations may be provided to provide the system with site diversity to prevent interruptions due to inclement weather.

While particular embodiments of the invention have been shown and described, numerous variations alternate embodiments will occur to those skilled in the art. Accordingly, it is intended that the invention be limited only in terms of the appended claims.

What is claimed is:

1. A communications system comprising:
   a first teleport station;
   a first user terminal;
   a satellite coupling the first teleport station to the first user terminal; and
   a network access point directly coupled to an Internet and directly coupled to the first teleport station through an optical fiber.

2. A communications system as recited in claim 1, wherein said satellite comprises a satellite in a Ka band.

3. A communications system as recited in claim 1, further comprising a second teleport station coupled to the first teleport station through said satellite.

4. A communications system as recited in claim 1, wherein the first user terminal is coupled to a second teleport station through an optical fiber.

5. A communications system as recited in claim 1, wherein the first user terminal is coupled to a second teleport station through a second satellite.

6. A communications system comprising:
   a satellite;
   a first teleport station;
   an optical fiber network;
   a second teleport station coupled to the first teleport station through said optical fiber network and said satellite;
   said optical fiber network providing a primary communication link until an irregularity is detected in said optical fiber, where, upon the sensing of the irregularity, routing the communication from said first teleport station to said second teleport station through said satellite.

7. A method of communicating between a first user terminal and a first geographic region served by a first satellite and a second user terminal in a second geographic region different than the first region comprises the steps of:
   directing a communication from a first user terminal to the first satellite;
   routing the communication from the first satellite to a first teleport station;
   routing the communication from the first teleport station to a second teleport station in the second geographic region by way of an optical fiber network; and
   routing the communication from the second teleport station to a second user terminal in the second geographic region.

8. A method as recited in claim 7, wherein the step of routing the communication from the second teleport station comprises routing the communication from the second teleport station to the second user terminal by way of an optical fiber.

9. A method as recited in claim 7, wherein the step of routing communication from the second teleport station comprises routing the communication from the second teleport station to the second user terminal by way of a second satellite.

10. A method as recited in claim 7, further comprising the step of coupling the first teleport station to the Internet.

11. A method of operating a communications system comprising the steps of:
    generating a plurality of spot beams directed to a respective plurality of teleport stations from a satellite;
    interconnecting the plurality of teleport stations with an optical communication network;
    in normal operating conditions, directing a communication from a first of said plurality of teleport stations through said satellite;
    when the first teleport station is encumbered, directing the communication through an optical link to a second teleport station; and
    directing the communication to the satellite from the second teleport station.

12. A method as recited in claim 11, further comprising the step of connecting the optical communication network to an Internet.

13. A method as recited in claim 11, wherein the plurality of beams are non-coextensive.

14. A method as recited in claim 11, wherein the plurality of beams reuse the same frequency.

15. A method as recited in claim 11, wherein directing a communication from a first of said plurality of teleport stations through said satellite comprises directing the communication from the first of said plurality of teleport stations through said satellite to a first user terminal.

16. A method as recited in claim 11, wherein directing a communication from a first of said plurality of teleport stations through said satellite comprises directing the communication from the first of said plurality of teleport stations through said satellite to a first user terminal through a third teleport station.

17. A method as recited in claim 11, further comprising directing the communication from the second teleport station to a first user terminal.

18. A method as recited in claim 11, further comprising directing the communication from the second teleport station to a first user terminal through an optical fiber.

19. A method as recited in claim 11, further comprising directing the communication from the second teleport station to a first user terminal through a second satellite.

* * * * *